US012328314B2

(12) United States Patent
Pak et al.

(10) Patent No.: US 12,328,314 B2
(45) Date of Patent: Jun. 10, 2025

(54) BOOTSTRAPPING WITH COMMON CREDENTIAL DATA

(71) Applicant: Arm Limited, Cambridge (GB)

(72) Inventors: Yongbeom Pak, Oulu (FI); Roni Sasson, Raanana (IL)

(73) Assignee: Arm Limited, Cambridge (GB)

( * ) Notice: Subject to any disclaimer, the term of this patent is extended or adjusted under 35 U.S.C. 154(b) by 244 days.

(21) Appl. No.: 17/297,778

(22) PCT Filed: Nov. 8, 2019

(86) PCT No.: PCT/GB2019/053157
§ 371 (c)(1),
(2) Date: May 27, 2021

(87) PCT Pub. No.: WO2020/115458
PCT Pub. Date: Jun. 11, 2020

(65) Prior Publication Data
US 2022/0052999 A1    Feb. 17, 2022

(30) Foreign Application Priority Data

Dec. 3, 2018    (GB) ...................................... 1819725

(51) Int. Cl.
*H04L 9/40* (2022.01)
*H04L 9/32* (2006.01)
*H04W 76/10* (2018.01)

(52) U.S. Cl.
CPC .......... *H04L 63/0884* (2013.01); *H04L 9/321* (2013.01); *H04L 9/3265* (2013.01);
(Continued)

(58) Field of Classification Search
None
See application file for complete search history.

(56) References Cited

U.S. PATENT DOCUMENTS

| 5,349,643 A | 2/1994 | Cox et al. |
| 5,737,419 A | 4/1998 | Gane |

(Continued)

FOREIGN PATENT DOCUMENTS

| AU | 2013100802 A4 | 7/2013 |
| CN | 1656830 A | 8/2005 |

(Continued)

OTHER PUBLICATIONS

Cooper et al.; RFC 5280—Internet X.509 Public Key infrastructure certificate . . . ; 2008; retrieved from the Internet https://www.rfc-editor.org/rfc/pdfrfc/rfc5280.txt.pdf; pp. 1-151, as printed. (Year: 2008).*

(Continued)

*Primary Examiner* — Michael W Chao
(74) *Attorney, Agent, or Firm* — DeWitt LLP (57) ABSTRACT

According to the present techniques there is provided a computer implemented method of bootstrapping a device by a bootstrap server, the method comprising: receiving, at the bootstrap server from the device as part of a bootstrap process, common credential data including a trust indicator to indicate that the common credential data is common for a group of devices; obtaining, at the bootstrap server, resource credential data based on or in response to the common credential data, the resource credential data to (Continued)

enable the device to authenticate with a resource; transmitting, from the bootstrap server to the device, the resource credential data.

18 Claims, 6 Drawing Sheets

(52) U.S. Cl.
CPC ........ *H04L 63/0823* (2013.01); *H04L 63/102* (2013.01); *H04L 63/104* (2013.01); *H04W 76/10* (2018.02)

(56) References Cited

U.S. PATENT DOCUMENTS

| | | | |
|---|---|---|---|
| 5,872,968 | A | 2/1999 | Knox et al. |
| 6,463,535 | B1 | 10/2002 | Drews |
| 6,950,660 | B1 | 9/2005 | Hsu et al. |
| 7,363,514 | B1 | 4/2008 | Behren |
| 7,882,345 | B1 | 2/2011 | Christensen |
| 7,971,045 | B1 | 6/2011 | Currid et al. |
| 8,108,455 | B2 | 1/2012 | Yeager et al. |
| 8,244,845 | B2 | 8/2012 | Rao |
| 8,370,491 | B1 | 2/2013 | Breau et al. |
| 8,532,640 | B2 | 9/2013 | Bussey |
| 8,554,912 | B1 | 10/2013 | Reeves |
| 8,738,898 | B2 | 5/2014 | Herwono |
| 8,787,575 | B2 | 7/2014 | Laaksonen |
| 8,788,825 | B1 | 7/2014 | Le |
| 8,938,061 | B1 | 1/2015 | Dendy |
| 9,032,217 | B1 | 5/2015 | Brandwine |
| 9,064,117 | B1 | 6/2015 | Worsley |
| 9,161,215 | B2 | 10/2015 | Kato |
| 9,307,405 | B2 | 4/2016 | Curtis et al. |
| 9,356,968 | B1 | 5/2016 | Dotan |
| 9,735,970 | B1* | 8/2017 | Shohat .................... H04L 9/321 |
| 9,860,235 | B2 | 1/2018 | Curtis et al. |
| 9,864,735 | B1 | 1/2018 | Lamprecht |
| 10,027,646 | B2 | 7/2018 | Curtis et al. |
| 10,129,268 | B2 | 11/2018 | David et al. |
| 10,185,829 | B2 | 1/2019 | Sasin et al. |
| 10,321,311 | B2* | 6/2019 | Sasin .................. H04L 63/0823 |
| 10,554,731 | B2 | 2/2020 | Pak |
| 10,581,620 | B2* | 3/2020 | Meyer .................. G06F 9/45558 |
| 11,678,183 | B2* | 6/2023 | Luo .................... H04L 63/0884 455/411 |
| 11,683,685 | B2* | 6/2023 | Smith .................... H04L 63/102 713/156 |
| 11,736,277 | B2* | 8/2023 | Wei ...................... H04L 9/0861 713/155 |
| 11,832,102 | B2* | 11/2023 | Heldt-Sheller ....... H04W 12/50 |
| 11,930,115 | B2* | 3/2024 | Keränen .............. H04L 9/3236 |
| 12,028,443 | B2* | 7/2024 | Cabre .................. H04L 9/0866 |
| 2001/0027527 | A1 | 10/2001 | Khidekel |
| 2002/0090085 | A1 | 7/2002 | Vanstone et al. |
| 2002/0147905 | A1* | 10/2002 | Perlman .................. H04L 9/007 713/157 |
| 2003/0028763 | A1 | 2/2003 | Malinen et al. |
| 2003/0041110 | A1* | 2/2003 | Wenocur ................. H04L 65/80 709/206 |
| 2003/0055894 | A1* | 3/2003 | Yeager ................ H04L 67/1095 709/204 |
| 2003/0074580 | A1* | 4/2003 | Knouse .............. H04L 63/0815 726/4 |
| 2003/0196084 | A1 | 10/2003 | Okereke |
| 2004/0015694 | A1* | 1/2004 | DeTreville .............. G06F 21/57 713/172 |
| 2004/0148505 | A1* | 7/2004 | Qiu ........................ G06F 21/33 713/175 |
| 2005/0010758 | A1 | 1/2005 | Landrock et al. |
| 2005/0114447 | A1* | 5/2005 | Cameron ............ G06F 21/6245 709/204 |
| 2005/0251690 | A1* | 11/2005 | Kuno ...................... G06F 21/10 380/201 |
| 2006/0053276 | A1 | 3/2006 | Lortz et al. |
| 2006/0075242 | A1 | 4/2006 | Aissi et al. |
| 2006/0085634 | A1* | 4/2006 | Jain ....................... H04L 9/3263 713/156 |
| 2006/0104234 | A1 | 5/2006 | Zhang |
| 2006/0117177 | A1 | 6/2006 | Buer |
| 2006/0130004 | A1 | 6/2006 | Hughes |
| 2006/0150241 | A1 | 7/2006 | Huh et al. |
| 2006/0155837 | A1 | 7/2006 | Kobayashi |
| 2006/0161771 | A1 | 7/2006 | Zhang |
| 2006/0185013 | A1* | 8/2006 | Oyama ................. H04W 8/085 726/21 |
| 2006/0200855 | A1 | 9/2006 | Willis |
| 2006/0218393 | A1 | 9/2006 | Hernandez |
| 2006/0259765 | A1 | 11/2006 | Song et al. |
| 2006/0277406 | A1 | 12/2006 | Hashimoto et al. |
| 2007/0011446 | A1 | 1/2007 | Kato et al. |
| 2007/0043608 | A1 | 2/2007 | May et al. |
| 2007/0055867 | A1 | 3/2007 | Kanungo et al. |
| 2007/0130476 | A1 | 6/2007 | Mohanty |
| 2007/0143388 | A1 | 6/2007 | Futa et al. |
| 2007/0220266 | A1 | 9/2007 | Cooper et al. |
| 2007/0220589 | A1 | 9/2007 | Salowey et al. |
| 2008/0034207 | A1 | 2/2008 | Cam-Winget et al. |
| 2008/0066166 | A1 | 3/2008 | Childs |
| 2008/0130902 | A1 | 6/2008 | Foo Kune et al. |
| 2008/0201262 | A1* | 8/2008 | Saito .................. G06Q 30/0601 705/50 |
| 2008/0256616 | A1 | 10/2008 | Guarraci |
| 2009/0013177 | A1 | 1/2009 | Lee' et al. |
| 2009/0063851 | A1 | 3/2009 | Nijdam |
| 2009/0086977 | A1 | 4/2009 | Berggren |
| 2009/0129597 | A1 | 5/2009 | Zimmer et al. |
| 2009/0215477 | A1 | 8/2009 | Lee et al. |
| 2009/0276620 | A1 | 11/2009 | McCarron et al. |
| 2009/0287922 | A1 | 11/2009 | Herwono et al. |
| 2009/0313466 | A1 | 12/2009 | Naslund et al. |
| 2010/0138652 | A1* | 6/2010 | Sela ..................... H04L 9/3228 713/158 |
| 2010/0304716 | A1 | 12/2010 | Hoeksel et al. |
| 2011/0154454 | A1 | 6/2011 | Frelechoux |
| 2011/0161663 | A1 | 6/2011 | Nakhjiri |
| 2011/0191765 | A1 | 8/2011 | Lo |
| 2011/0225296 | A1 | 9/2011 | Hong et al. |
| 2011/0231281 | A1 | 9/2011 | Bollay |
| 2012/0042081 | A1 | 2/2012 | Liao et al. |
| 2012/0060025 | A1* | 3/2012 | Cahill ...................... H04L 63/08 713/155 |
| 2012/0079031 | A1 | 3/2012 | Matthews et al. |
| 2012/0108207 | A1 | 5/2012 | Schell et al. |
| 2012/0122423 | A1 | 5/2012 | Helmreich |
| 2012/0221725 | A1 | 8/2012 | Schroeder, Jr. et al. |
| 2013/0035067 | A1 | 2/2013 | Zhang et al. |
| 2013/0081113 | A1 | 3/2013 | Cherian et al. |
| 2013/0095789 | A1 | 4/2013 | Keevill et al. |
| 2013/0150105 | A1 | 6/2013 | Clevorn et al. |
| 2013/0160094 | A1 | 6/2013 | Luo |
| 2013/0174241 | A1 | 7/2013 | Cha et al. |
| 2013/0198838 | A1* | 8/2013 | Schmidt ................ H04L 63/126 726/22 |
| 2013/0212215 | A1 | 8/2013 | Ukkola |
| 2013/0222109 | A1 | 8/2013 | Lim |
| 2013/0310003 | A1 | 11/2013 | Sadhvani et al. |
| 2014/0059226 | A1* | 2/2014 | Messerli ................ H04L 67/51 709/226 |
| 2014/0082715 | A1 | 3/2014 | Grajek |
| 2014/0089652 | A1 | 3/2014 | Cerri et al. |
| 2014/0099916 | A1 | 4/2014 | Mallikarjunan et al. |
| 2014/0165147 | A1 | 6/2014 | Hershberg et al. |
| 2014/0192634 | A1 | 7/2014 | Vadivelu |
| 2014/0289790 | A1 | 9/2014 | Wilson et al. |
| 2014/0330952 | A1 | 11/2014 | Starsinic et al. |
| 2014/0349614 | A1 | 11/2014 | Starsinic |
| 2015/0012744 | A1 | 1/2015 | Chen et al. |
| 2015/0038115 | A1* | 2/2015 | Kim ...................... H04W 12/084 455/411 |
| 2015/0067329 | A1 | 3/2015 | Ben Saied |
| 2015/0071139 | A1 | 3/2015 | Nix |

(56) References Cited

U.S. PATENT DOCUMENTS

| | | | |
|---|---|---|---|
| 2015/0113592 A1 | 4/2015 | Curtis et al. | |
| 2015/0113599 A1 | 4/2015 | Curtis et al. | |
| 2015/0237031 A1 | 8/2015 | Neuman et al. | |
| 2015/0244696 A1 | 8/2015 | Ma | |
| 2015/0288517 A1 | 10/2015 | Evans | |
| 2015/0296470 A1 | 10/2015 | Kim et al. | |
| 2015/0304110 A1 | 10/2015 | Oberheide | |
| 2015/0305008 A1 | 10/2015 | Kim et al. | |
| 2015/0319263 A1 | 11/2015 | Koch et al. | |
| 2015/0334099 A1 | 11/2015 | Zhang et al. | |
| 2015/0358824 A1 | 12/2015 | Kim et al. | |
| 2016/0065556 A1 | 3/2016 | Sasin et al. | |
| 2016/0072808 A1 | 3/2016 | David et al. | |
| 2016/0191489 A1 | 6/2016 | Curtis et al. | |
| 2016/0285858 A1 | 9/2016 | Li et al. | |
| 2017/0019427 A1 | 1/2017 | Vank et al. | |
| 2017/0039373 A1 | 2/2017 | Sasin et al. | |
| 2017/0041287 A1 | 2/2017 | Pak et al. | |
| 2017/0041782 A1 | 2/2017 | Yu | |
| 2017/0048336 A1 | 2/2017 | Novo Diaz | |
| 2017/0155554 A1 | 6/2017 | Whittemore | |
| 2017/0251428 A1 | 8/2017 | Jimenez | |
| 2017/0264613 A1* | 9/2017 | Phillips | H04W 12/082 |
| 2017/0346848 A1 | 11/2017 | Smith et al. | |
| 2018/0152541 A1 | 5/2018 | Mathison et al. | |
| 2018/0191508 A1 | 7/2018 | Scriber et al. | |
| 2018/0279099 A1 | 9/2018 | Novo Diaz | |
| 2018/0295119 A1 | 10/2018 | Curtis et al. | |
| 2018/0324168 A1 | 11/2018 | Curtis et al. | |
| 2019/0005072 A1 | 1/2019 | Rangaraj | |
| 2019/0044957 A1 | 2/2019 | David et al. | |
| 2019/0074982 A1* | 3/2019 | Hughes | H04L 9/0863 |
| 2019/0132309 A1 | 5/2019 | Wei | |
| 2019/0156040 A1 | 5/2019 | Sasin et al. | |
| 2019/0158355 A1* | 5/2019 | Ramisetty | H04L 63/0853 |
| 2019/0289467 A1 | 9/2019 | Sasin et al. | |
| 2019/0394172 A1 | 12/2019 | Hersent | |
| 2020/0059881 A1* | 2/2020 | Gupta | H04L 63/0807 |
| 2020/0106624 A1* | 4/2020 | Russell | H04L 9/50 |
| 2020/0274707 A1 | 8/2020 | Kiiskila | |
| 2020/0274719 A1 | 8/2020 | Pak | |
| 2020/0327233 A1 | 10/2020 | Pak et al. | |
| 2020/0329013 A1 | 10/2020 | Zhou | |
| 2021/0258308 A1 | 8/2021 | Avetisov | |
| 2023/0145044 A1* | 5/2023 | Ben Henda | H04W 88/023 370/329 |
| 2024/0319979 A1* | 9/2024 | Smith | G06F 8/65 |
| 2024/0397310 A1* | 11/2024 | Ocak | H04L 61/4511 |

FOREIGN PATENT DOCUMENTS

| | | |
|---|---|---|
| CN | 101030862 | 9/2007 |
| CN | 101217541 A | 7/2008 |
| CN | 101951595 A | 1/2011 |
| CN | 102 469 455 A | 5/2012 |
| CN | 102469455 | 5/2012 |
| CN | 102 572 818 A | 7/2012 |
| CN | 102572818 | 7/2012 |
| CN | 101309301 B | 11/2012 |
| EP | 2466791 A1 | 6/2012 |
| EP | 3076695 | 10/2016 |
| GB | 2533385 A | 6/2016 |
| KR | 20060126705 | 12/2006 |
| KR | 20140113007 A | 9/2014 |
| WO | WO 2006059195 A1 | 6/2006 |
| WO | WO 2009141493 A1 | 11/2009 |
| WO | WO 2011123329 A1 | 10/2011 |
| WO | WO 2013049292 A1 | 4/2013 |
| WO | 2013/120225 A1 | 8/2013 |
| WO | WO2013120225 | 8/2013 |
| WO | WO 2014048236 A1 | 3/2014 |
| WO | WO 2014069968 A1 | 5/2014 |
| WO | WO 2014114354 A1 | 7/2014 |
| WO | WO 2014116152 A1 | 7/2014 |
| WO | WO 2014182674 A1 | 11/2014 |
| WO | WO 2014190177 A1 | 11/2014 |
| WO | WO 2015036785 A1 | 3/2015 |
| WO | WO 2015042370 A1 | 3/2015 |
| WO | WO 2015065913 A1 | 5/2015 |

OTHER PUBLICATIONS

No stated author; Lightweight Machine to Machine Technical Specification Approved Version 1.0—Feb. 8, 2017; retrieved from the Internet https://www.openmobilealliance.org/; pp. 1-138, as printed. (Year: 2017).*

Berg et al.; Blend-In: a Privacy-Enhancing Certificate-Selection Method for Vehicular Communication; 2009; retrieved from the internet https://ieeexplore.ieee.org/abstract/document/5170042; pp. 1-10 as printed. (Year: 2009).*

Search Report dated Mar. 17, 2016 for GB Application No. GB1513750.8, 6 pages.

Examination Report dated Nov. 10, 2017 for Application No. GB1513750.8, 3 pages.

Search Report dated Jan. 12, 2015 for GB Application No. 1415562.6, 5 pages.

Search Report dated Jun. 8, 2020 for GB Application No. GB1415562.6, 5 pages.

Search Report dated Feb. 26, 2021 for GB Application No. GB1415562.6.

Examination Report dated Jul. 12, 2018 for Application No. GB1806259.6, 6 pages.

"Public Key Infrastructures and Digital Certificates for the Internet of Things", Schukat et al, 26th Irish Signals and Systems Conference (ISSC), pp. 1-5, IEEE, Jun. 24-25, 2015.

"Lightweight M2M: Enabling Device Management and Applications for the Internet of Things", Feb. 26, 2014, Vodafone, Arm and Ericsson, 16 pages.

"Security for IoT. An effective DTLS with public certificates", Panwar et al., 2015 International Conference on Advances in Computer Engineering and Applications (ICACEA), pp. 163-166, IEEE, Mar. 19-20, 2015.

Search Report dated Mar. 17, 2016 for GB Application No. 1513748.2, 7 pages.

International Search Report and Written Opinion dated Apr. 8, 2015 for PCT Application No. PCT/GB2014/053098, 20 pages.

International Preliminary Report on Patentability dated Apr. 28, 2016 for PCT Application No. PCT/GB2014/053098, 14 pages.

International Preliminary Report on Patentability dated Apr. 28, 2016 for PCT Application No. PCT/GB2014/053097, 10 pages.

International Preliminary Report on Patentability dated Apr. 28, 2016 for PCT Application No. PCT/GB2014/053096, 9 pages.

HP Device Registration Repository Capability; M2M06-014 Device Registry Repository Capability; ETSI Draft; M2M06-014 Device Registry Repository Capability; European Telecommunications Standards Institute, 650, Route Des Lucioles; F-06921 Sophia-Antipolis; France, vol. SmartM2M, Oct. 13, 2009, pp. 1-2. XP014207713.

[Internet Citation], Certicom Device Certification Authority for ZigBee Smart Energy, *Certicom Corp.*, http://www.certicom.com/index.php/device-authentication-service/smart-energy-device-certificate-service, Oct. 1, 2013, printed on Oct. 16, 2013, 2 pages.

Search Report dated Mar. 18, 2015 for GB Application No. 1415861.2, 3 pages.

First Office Action issued Dec. 29, 2018 for Chinese Application No. 201480056752.8, 38 pages.

Second Office Action issued May 17, 2019 for Chinese Application No. 201480056752.8, 9 pages.

Office Action dated Mar. 31, 2020 for Chinese Application 201610629935.5, 16 pages.

Examination Report corresponding to GB1917404.4 dated Feb. 24, 2021.

Combined Search Report and Examination Report corresponding to GB1917404.4 dated May 28, 2020.

International Search Report and Written Opinion corresponding to PCT/GB2020/050279 dated May 4, 2020.

(56) References Cited

OTHER PUBLICATIONS

International Preliminary Report on Patentability corresponding to PCT/GB2020/050279 dated Nov. 25, 2021.
Combined Search Report and Examination Report corresponding to GB1901421.6, dated Aug. 1, 2019.
Examination Report corresponding to GB1901421.6 dated Aug. 18, 2020.
Examination Report corresponding to GB1901421.6 dated Apr. 9, 2021.
International Search Report and Written Opinion corresponding to PCT/GB2020/050048 dated Jun. 23, 2020.
International Preliminary Report on Patentability corresponding to PCT/GB2020/050048 dated Aug. 12, 2021.
International Search Report and Written Opinion corresponding to PCT/GB2020/051093, dated Jun. 25, 2020.
Combined Search and Examination Report corresponding to GB2002697.7, dated Sep. 1, 2020.
Examination Report corresponding to GB2002697.7, dated Jul. 14, 2021.
International Preliminary Report on Patentability corresponding to PCT/GB2020/051093, dated Nov. 25, 2021.
Search Report dated Mar. 22, 2019 for GB Application No. 1819722.8, 10 pages.
International Search Report and Written Opinion dated Jan. 30, 2015 for PCT Application No. PCT/GB2014/053096, 12 pages.
International Search Report and Written Opinion dated Jan. 30, 2015 for PCT Application No. PCT/GB2014/053097, 15 pages.
Application and File history for U.S. Appl. No. 17/594,231, filed Oct. 7, 2021. Inventor: Pak et al.
Wujun Zhang, et al. "End-to-End Security Scheme for Machine Type Communication Based on Generic Authentication Architecture", Intelligent Networking and Collaborative Systems (INCOS), 2012 4th International Conference On, IEEE, Sep. 19, 2012 (Sep. 19, 2012), pp. 353-359 Section IV.
Examination Report for GB Application No. GB1819725.1 dated Aug. 11, 2020.
Examination Report for GB Application No. GB1819725.1 dated Dec. 3, 2020.
Examination Report and Search for GB Application No. GB1819725.1 dated May 1, 2019.
International Search Report and Written Opinion for PCT/GB2019/053157 date mailed Jan. 14, 2020.
International Preliminary Report on Patentability (IPRP) date mailed Jun. 17, 2021.
Office Action corresponding to CN 201980074394.6, dated Jul. 27, 2023, with English translation.

\* cited by examiner

BOOTSTRAPPING WITH COMMON CREDENTIAL DATA

The present techniques generally relate to a secure bootstrap mechanism for endpoint devices. In particular, the bootstrap mechanism provides for secure services between the large-resource traditional Internet and constrained-resource (Internet Protocol) IP-enabled endpoint devices.

The Internet of Things encompasses devices and networks that are IP-enabled and Internet-connected, along with the Internet services monitoring and controlling those devices. Such IP-enabled devices connected to the internet may be termed data processing devices, end nodes, remote devices or Internet of Things (IoT) devices and include sensors, machines, active positioning tags, radio-frequency identification (RFID) readers and building automation equipment to name but a few. Such an IP-enabled device is hereafter referred to as "device."

Devices in the IoT may generally, but not necessarily, be resource-limited embedded devices, often battery powered and connected by low-power, low-bandwidth wireless networks to the Internet.

The IPv6 over Low Power Wireless Standard (6LoWPAN) is a set of standards which enable the efficient use of IPv6 over low-power, low-rate wireless networks on devices through an adaption layer and the optimization of related protocols.

The Open Mobile Alliance's LwM2M standard (i.e. 'lightweight Machine-to-Machine') is applicable to 6LoWPAN whereby a LwM2M bootstrap process is used to provide mandatory information (e.g. credential data) through a bootstrap interface for devices so that the devices can perform authentication (e.g. establish secure communications, register, enrol etc.) with one or more servers, whereby authentication assigns a device to a server to access one or more services (e.g. applications, databases etc.).

The present applicant has recognised the need to for an improved bootstrap process to authenticate a device with a server (e.g. a resource server such as an LwM2M server).

According to a first techniques there is provided a computer implemented method of bootstrapping a device by a bootstrap server, the method comprising: receiving, at the bootstrap server from the device as part of a bootstrap process, common credential data including a trust indicator to indicate that the common credential data is common for a group of devices; obtaining, at the bootstrap server, resource credential data based on or in response to the common credential data, the resource credential data to enable the device to authenticate with a resource; transmitting, from the bootstrap server to the device, the resource credential data.

According to a further technique there is provided a computer implemented method of bootstrapping a device from a bootstrap server, the method comprising: transmitting, from the device to a first server as part of a first bootstrap process, common credential data including a trust indicator to indicate that the common credential data is common for a group of devices; receiving, from the first server, first resource credential data to enable the device to authenticate with a second server.

According to a further technique there is provided a device comprising: storage circuitry to store common credential data including a trust indicator to indicate that the common credential data is common for a group of devices; communication circuitry to transmit, from the device to a first server as part of a bootstrap process, the common credential data.

The techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

A network, such as an Internet of Things (IoT) network, may comprise multiple connected devices and services with different functionalities. The devices and services may be provided by different parties, and typically, the devices are resource-constrained with limited power supply, communication capability, CPU performance and memory.

Generally speaking, a bootstrap or bootstrapping process includes some or all of the steps that enable a new device to join a network and to authenticate with one or more servers to access one or more resources or services via those servers, hereafter "resource servers."

Traditional bootstrapping processes place configuration and costs burdens upon administrators of the device (e.g. original equipment manufacturers (OEMs)/owners/manufacturers etc), who are required to obtain/generate credential data which is unique for each device and to provision the unique credential data on each individual device.

Broadly speaking, embodiments of the present techniques provide an apparatus, system and method for enabling devices to join a network via a bootstrapping process which is less onerous than those known in the art. In particular, the present techniques provide for a bootstrapping process using credential data which is common to two or more devices.

Figure 1A:
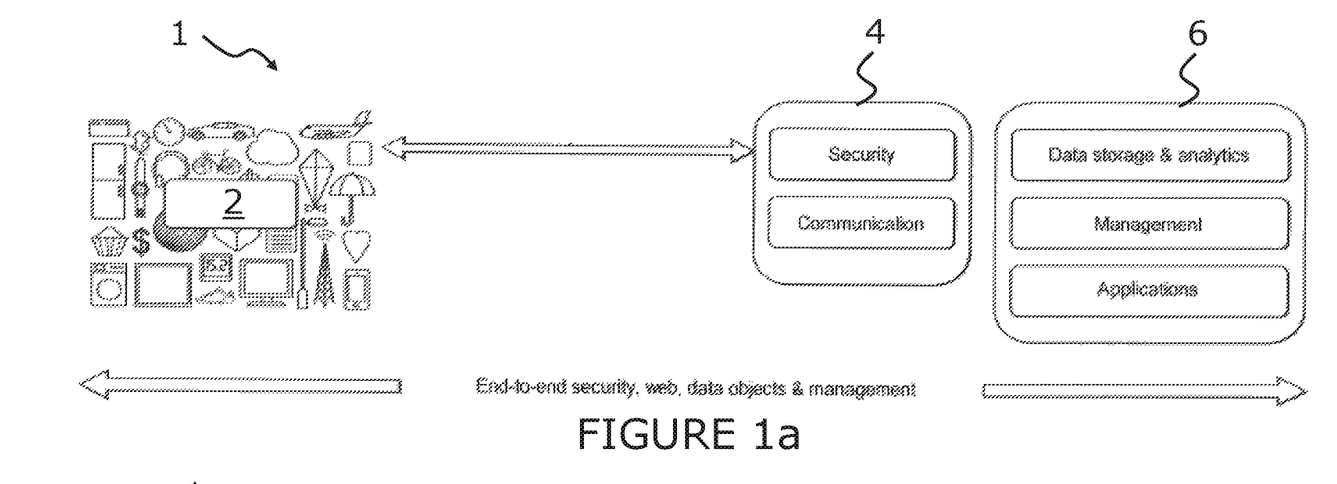
FIG. 1a shows a deployment scenario for a plurality of devices requiring access to one or more services according to an embodiment.
Figure 1B:
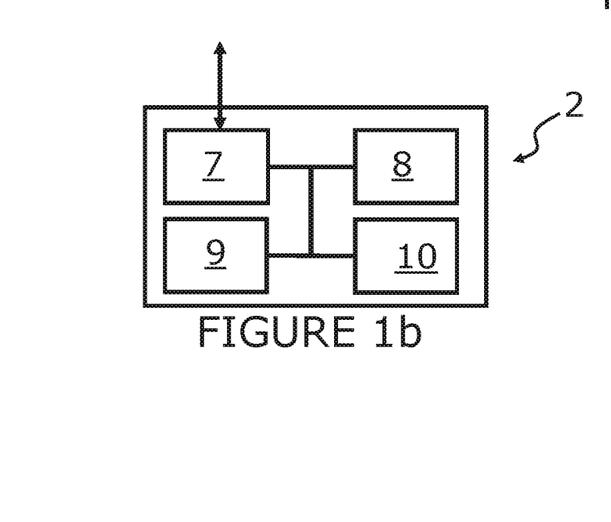
FIG. 1b shows a schematic illustration of a device of FIG. 1a according to an embodiment.

FIG. 1a shows a deployment scenario 1 for a device 2 operable to access one or more services 6, and FIG. 1b illustrates a device 2 according to an example.

Device 2 may be a computer terminal, a laptop, a tablet or mobile-phone, or may, for example, be a lightweight machine to machine (LwM2M) device used to turn objects into "smart-objects" such as streetlights, electric meters, temperature sensors and building automation as part of the IoT, and a range of market segments in which device 2 may be used is illustratively depicted in FIG. 1*a*. It will be appreciated that the examples of market segments in FIG. 1*a* are for illustrative purposes only and the claims are not limited in this respect.

Referring to FIG. 1*b*, the device 2 comprises communication circuitry 7 for communicating with a remote apparatus.

The communication circuitry 7 may use wireless communication, such as communication using wireless local area network (Wi-Fi), short range communication such as radio frequency communication (RFID) or near field communication (NFC), or communications used in wireless technologies such as ZigBee, Thread, Bluetooth, Bluetooth LE, IPv6 over Low Power Wireless Standard (6LoWPAN) or Constrained Application Protocol (CoAP). Also, the communication circuitry may use a cellular network such as 3G or 4G. The communication circuitry 7 may also use wired communication such as using a fibre optic or metal cable. The communication circuitry 7 could also use two or more different forms of communication, such as several of the examples given above in combination.

The device 2 further comprises processing circuitry 8 for controlling various processing operations performed by the device 2.

The device 2 may further comprise input/output (I/O) circuitry 9, such that the device 2 can receive inputs (e.g. user inputs, sensor inputs, measurement inputs etc.) and or generate outputs (e.g. audio/visual/control commands etc.).

The device 2 further comprises storage circuitry 10 for storing data, such as credential data, whereby the storage circuitry 10 may comprise volatile and/or non-volatile memory.

Such credential data may include one or more of: certificates, cryptographic keys (e.g. shared symmetric keys, public keys, private keys), identifiers (e.g. direct or indirect identifiers) etc.) whereby such credential data may be used by the device to authenticate with one or more remote resources (e.g. a bootstrap server/resource server).

In the present figures, remote resource 4 is depicted as resource server 4 which may be part of, or interface with one or more public networks (e.g. the internet) and/or private networks enabling deployment of services in a secure manner from a private server, private cloud or public cloud environment.

The resource server 4 may comprise hardware/software capable of providing server functionality, for example to provide access to a service 6 with which it interfaces or hosts, whereby such services may include one or more of: web service(s); data storage & analytics service(s), management service(s) and application service(s), although this list is not exhaustive.

The resource server 4 may, for example, be a gateway device in a home, a machine-to-machine (M2M) server, a LwM2M server, an edge server, a computer terminal, a laptop, a tablet or mobile-phone, an application hosted on a or may itself be a device.

Device 2 communicates with resource server 4 using appropriate standards or protocols such as open IETF standards such as CoAP over a first network, such as, for example, a low-power wireless network using 6LoWPAN, although any suitable standard(s)/protocol(s)/network(s) may be used. It will be appreciated that one or more intermediary devices, such as a gateway device, edge device etc. may be located between the device 2 and resource server 4.

In embodiments, the device 2 may authenticate (e.g. establish secure communications, register, enroll etc.) with a remote resource 4 whereby in embodiments the device may input credential data to a security protocol to authenticate with the remote resource as will be described in more detail in the following figures.

Figure 2:
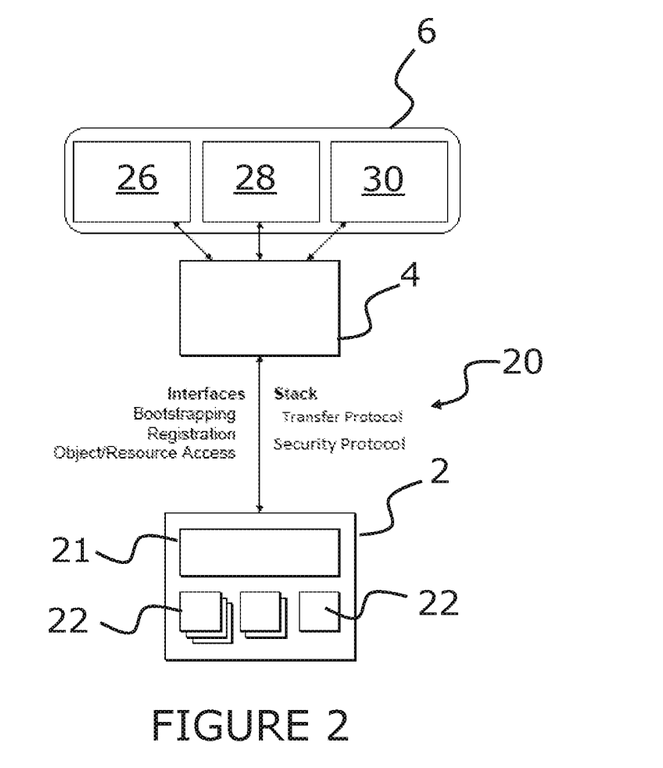
FIG. 2 shows an architecture for communications between a device of FIG. 1b and a bootstrap server according to an embodiment.

FIG. 2 illustratively shows an example architecture 20 which defines the communication protocol for use between a client 21 on the device 2 and software on the resource server 4. As above, the resource server 4 may be located/hosted on a public or private network.

The client 21 resides on the device 2 and may be integrated as a software library or built-in function of a module.

Logical interfaces may be defined between the client 21 and resource server 4, and three logical interfaces are depicted in FIG. 2*a*, namely 'Bootstrapping' being pre-provisioned or device/server initiated; 'Registration' to authenticate or register the device and its device resources; and 'Resource Access' to enable resource server 4 access to a device resource 22 on the device 2. Additional, or alternative, logical interfaces between the client 21 and resource server 4 may be provided.

The architecture 20 may use a transfer protocol to transfer data. Such a transfer protocol may, for example, comprise a CoAP or may be HTTP, but any suitable transfer protocol may be used.

The architecture 20 may use a security protocol(s) to establish a communications path or channel for providing secure communications between device 2 and resource server 4 for data/payloads. The security protocols may, for example comprise Transport Layer Security/Datagram Transport Layer Security (TLS/DTLS), whereby TLS/DTLS may be used to establish a secure channel between the device 2 and resource server 4 whereby TLS/DTLS security modes include both pre-shared key and public key technology. The data (e.g. credential data) protected by TLS/DTLS may be encoded as plain text, binary TLV, JSON, CBOR, or any other suitable data exchange format.

Each piece of data (e.g. credential data) in storage on the device 2 is a resource 22, whereby such resources 22 can be read, written or executed. The resources may be provisioned at manufacture (e.g. during a factory provisioning process) or during an authentication process with a server.

It will be understood that the device resources may be remotely managed by, for example, software hosted on resource server 4 and or an application running as part of a service 6, whereby such an application may include a data storage & analytics service 26, an application service 28 and/or a device management application 30, although these are examples of applications which may run as part of service 6.

Such device resources may include credential data such as identifiers to identify a remote resource, whereby the device 2 uses the appropriate credential to authenticate therewith. For example, the credential data in a certificate on the device can be input to a TLS/DTLS security protocol to establish a secure communication path or channel with a remote resource.

Certificates are typically certificate authority (CA) certificates but they may also be pinned, end entity certificates.

The certificates may comprise an identifier used by a device to locate a remote resource and/for verification purposes (e.g. to authenticate communications according to an identifier matching algorithm).

Identifiers may include one or more of: fully qualified domain name (FQDN), a Uniform Resource Locator (URL)), a Uniform Resource Indicator (URI), a Uniform Resource Name (URN) and an IP address (e.g. IPv4 or IPv6 address).

As will be appreciated by a person skilled in the art, the device resources may be provisioned on a device during a bootstrapping process and the present techniques provide a bootstrapping functionality for the device, whereby a bootstrap server manages the provision of device resources to enable the device to access one or more services.

Figure 3:
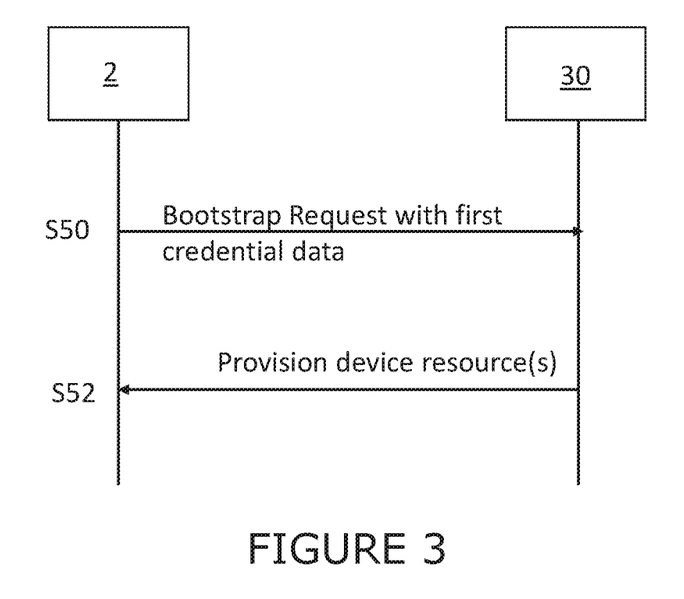
FIG. 3 shows an illustrative example of a device-initiated bootstrap of a device by a bootstrap server.

In a simplified form as shown in FIG. 3, a device-initiated bootstrap process comprises a bootstrap request sent (S50) from the device 2 to authenticate with a bootstrap server 30 using a common certificate provisioned on the device 2, whereby the common certificate may also be used by one or more further devices to authenticate with the bootstrap server 30.

The bootstrap process may also initiate secure communications between the device 2 and bootstrap server 30, using, for example, credential data (e.g. the common certificate, a cryptographic key) as an input to TLS/DTLS protocol.

In the present techniques, the common certificate comprises a trust indicator or trust level extension to indicate that it is a common certificate, whereby the trust indicator may comprise, for example, alphanumeric text, a code, or a value.

The common certificate may further include a group identifier for the group of devices to which the common certificate corresponds. In embodiments the group identifier may comprise device identifiers for each device in the group (e.g. a MAC address of each device).

In response to authenticating the device 2, the bootstrap server 30 provisions credential data on the device 2 to enable the device 2 to access a further remote resource (e.g. a resource server).

Figure 4A:
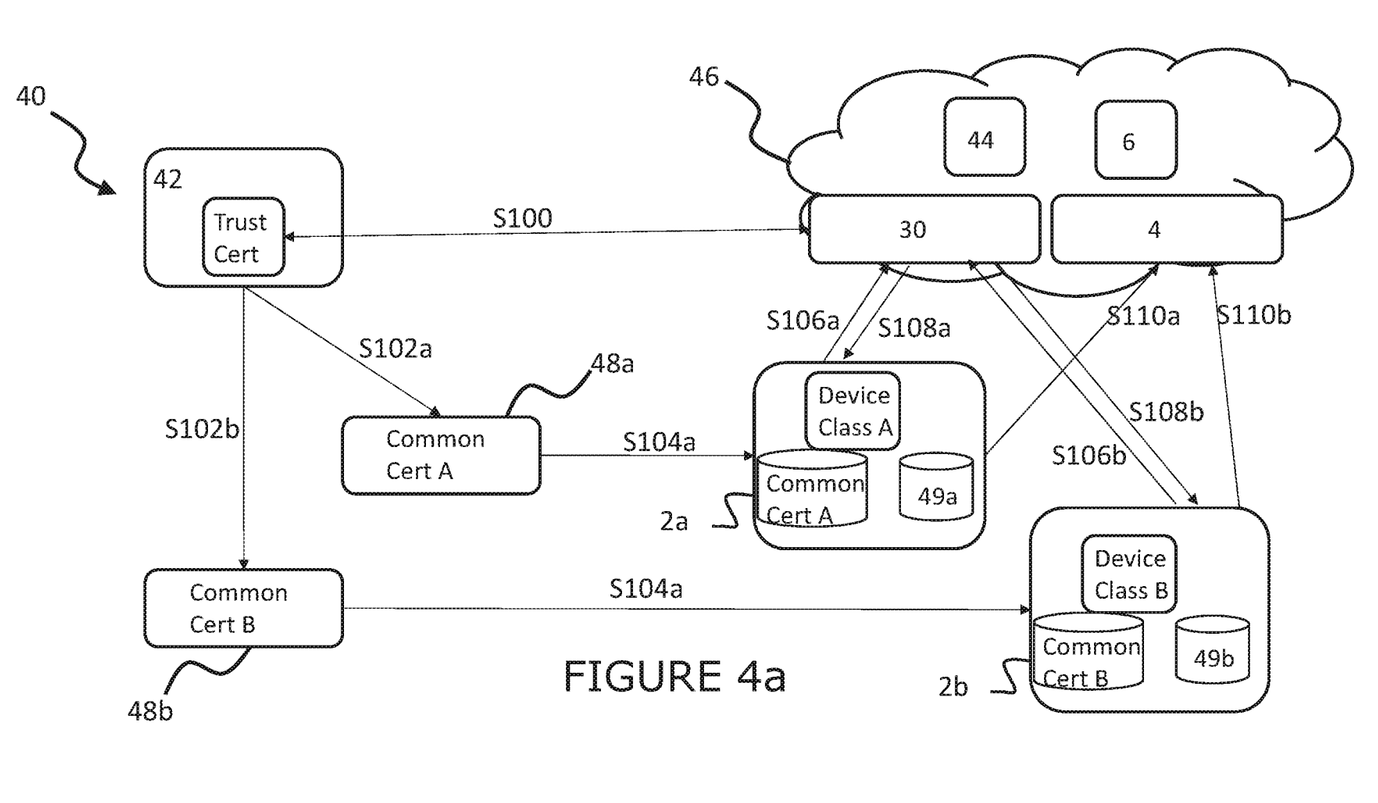
FIG. 4a schematically shows a block diagram of a system 40 in which two devices use common credential data to authenticate with a server.

FIG. 4a schematically shows a block diagram of a system 40 in which two devices 2a and 2b use credential data to authenticate with a bootstrap server 30 and obtain further credential data therefrom to authenticate with resource server 4. In FIG. 4a, the device 2a is part of a first group of devices, whilst device 2b is part of a different second group of devices.

At S100, an administrator 42 obtains a root or intermediate certificate (e.g. an X.509 certificate) signed by a certificate authority (CA) such as Cybertrust or GlobalSign (hereafter "trust certificate"), and registers the trust certificate with device management platform 46 (e.g. by uploading the trust certificate via an application programmable interface (API) of the device management platform 46).

The device management platform 46 of FIG. 4a is depicted as being a cloud platform (e.g. where the device management platform is hosted on public or private cloud infrastructure) comprising the bootstrap server 30 and resource server 4.

It will be appreciated that the device management platform 46 is not limited to a cloud platform and may comprise a private platform (e.g. where the device management platform is hosted on a private or on-premise infrastructure); and a hybrid cloud platform (e.g. a combination of the public and private platforms).

In embodiments the administrator 42 may have an associated account 44 at the device management platform 46, the account 44 having, for example, credential data associated with that administrator 42 (e.g. an account ID, the uploaded trust certificate, one or more associated cryptographic keys (e.g. public key) etc.).

In embodiments the trust certificate may be registered at the device management platform 46 as part of a bring-your-own-certificate (BYOC) process whereby on registering the trust certificate the administrator may be provisioned with credential data with which the administrator may provision on one or more devices to enable the devices to authenticate with one or more remote resources. Such credential data provided to the administrator may include a bootstrap credential such as a bootstrap server identifier (e.g. a URI, IPv6 address etc).

At S102a the administrator 42 generates a first common certificate 48a for a first group of devices, and at S102b generates a second common certificate 48b for a second group of devices, whereby the first and second common certificates may be derived from the trust certificate (e.g. signed using a cryptographic key associated with the trust certificate). Such a cryptographic key associated with the trust certificate may, for example, be a private key, which is part of a public/private key pair provisioned at the administrator 42 (e.g. by a CA), or the cryptographic key associated with the trust certificate may be a private key generated along with a corresponding public key by the administrator (e.g. as part of a certificate signing request)). The claims are not limited in this respect and in some embodiments the cryptographic associated with the trust certificate and used to sign the trust certificate may be a public key.

The first and second common certificates 48a, 48b may include a trust indicator indicating that the certificate is a common certificate and further include bootstrap credential data to enable the device 2 to authenticate with the bootstrap server 30.

At S104a, the administrator provisions common credential data comprising the first common certificate 48a on one or more devices of the first group of devices, and at S104b, the administrator provisions common credential data comprising the second common certificate 48b on one or more devices of the second group of devices. Provisioning the common credential data on the respective devices may be performed as an out-of-band process although the claims are not limited in this respect. The common credential data may be stored as a device resource(s) in non-volatile memory on a device. In some embodiments some or all of the common credential data may be permanently stored on the device. For example, the common certificate may be stored in a read-only memory.

In other examples some or all of the common credential data is temporarily stored at the device, for example where the common credential data has a limited validity.

At S106a, a device 2a of the first group uses common credential data comprising the first common certificate to authenticate itself with the bootstrap server 30 as part of a bootstrap process, whereby, for example, on receiving a bootstrap request the bootstrap server 30 determines whether the first common certificate has a chain of trust to a trusted source (e.g. by verifying a signature in the first common certificate using a corresponding cryptographic key (e.g. a public key)); the common certificate includes a trust indicator; and/or whether the device 2a is in the group to which the first common certificate corresponds.

In embodiments a secure communication channel is established between the device 2a and bootstrap server 30 using the respective common credential data.

The bootstrap server 30 generates and/or obtains credential data 49a to enable the authenticated device 2a to communicate with the resource server 4 (hereafter "resource credential data"), and at S108a transmits the resource credential data 49a to the device 2a.

At S106b, a device 2b of the second group uses common credential data comprising the second common certificate to authenticate itself with the bootstrap server 30 as part of a bootstrap process, whereby, for example, on receiving a bootstrap request the bootstrap server 30 determines whether the second common certificate has a chain of trust to a trusted source (e.g. by verifying a signature in the second common certificate using a corresponding cryptographic key (e.g. a public key)); the common certificate includes a trust indicator; and/or whether the device 2b is in the group to which the second common certificate corresponds.

In embodiments a secure communication channel is established between the device 2b and bootstrap server 30 using the respective common credential data.

The bootstrap server 30 generates and/or obtains resource credential data 49b to enable the authenticated device 2b to communicate with the resource server 4 and at S108b transmits the resource credential data 49b to the device 2b.

In embodiments, the respective resource credential data 49a, 49b may comprise a resource certificate, an identifier for the resource server (e.g. a URI, IPv6 address etc.). Additionally, or alternatively, the respective resource credential data 49a, 49b may comprise a bootstrap certificate, an identifier (e.g. a URI, IPv6 address etc.) for the bootstrap server 30 or a further bootstrap server (not shown) with which the device 2a, 2b can authenticate.

At S110a, device 2a uses the resource credential data 49a to authenticate with the resource server 4, whereby, on being successfully authenticated, the device 2a may access one or more services 6.

At S110b, device 2b uses the resource credential data 49b to authenticate with the resource server 4, whereby, on being successfully authenticated, the device 2b may access one or more services 6.

As such, the present techniques enable one or more devices in a group of devices to authenticate with a bootstrap server using common credential data for that group (e.g. a common certificate). Such functionality reduces the burden for device administrators because they are not required to generate and/or provision unique credential data on devices to enable the devices perform a bootstrapping process.

The present techniques further enable the one or more devices to use the bootstrap credential data to authenticate with the bootstrap server without the common certificate after the initial bootstrap process. For example, when the resource credential data 49a, 49b expires, the respective device 2a, 2b can use the bootstrap credential data to obtain valid resource credential data.

In the case of a factory reset of a device, when, for example, the common credential data is permanently stored on the device, the device can use the common certificate to obtain the resource credential data from the bootstrap server 30.

Additionally, or alternatively, rather than the common credential data, the device can use the bootstrap credential data to obtain the resource credential data from the same bootstrap server 30 or a different bootstrap server.

Figure 4B:
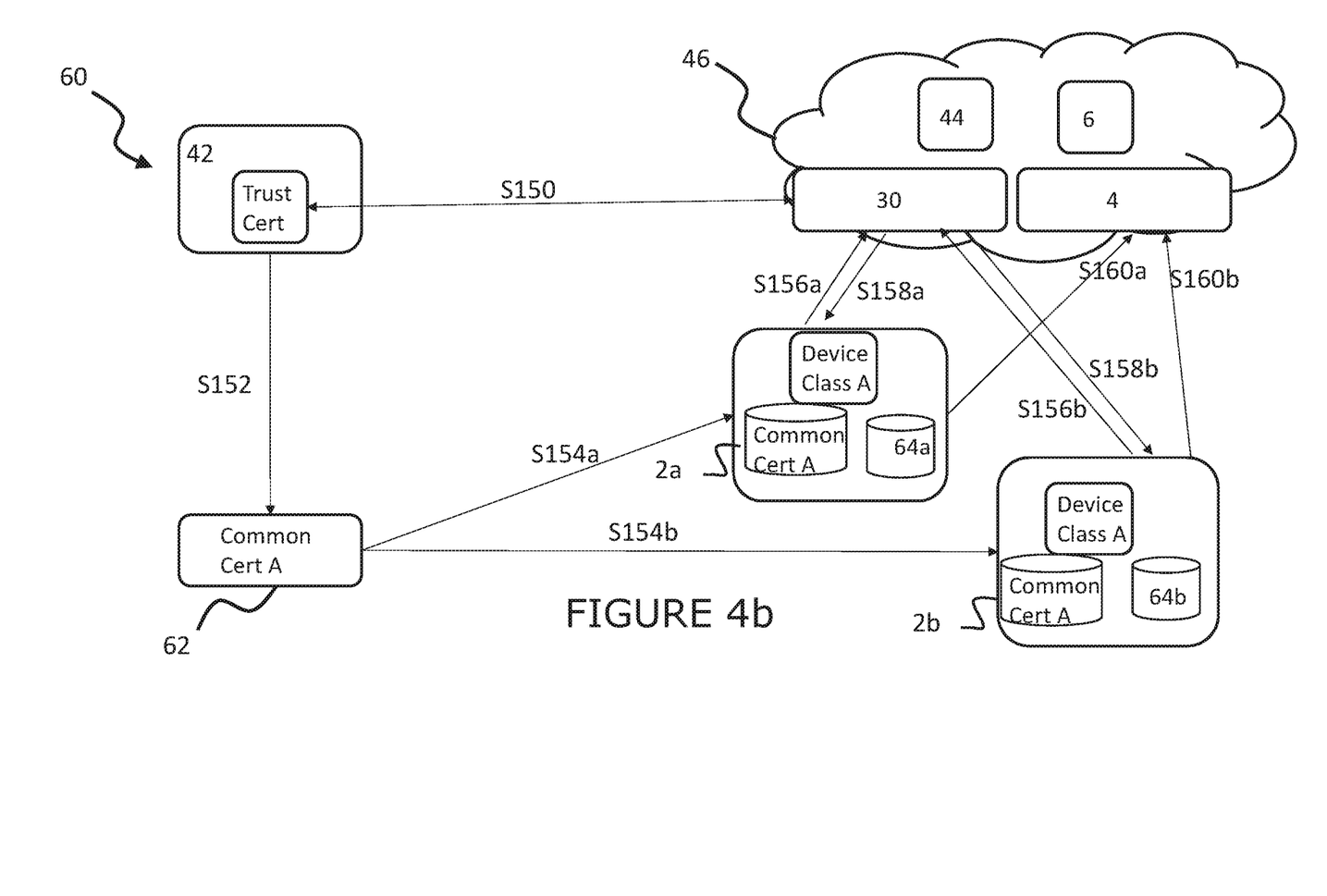
FIG. 4b schematically shows a block diagram of a system 40 in which two devices uses the same common credential data to authenticate with a server.

FIG. 4b schematically shows a block diagram of a system 60 in which two devices 2a and 2b use credential data to authenticate with a bootstrap server 30 using the same credential data and obtain further credential data to authenticate with resource server 4. In FIG. 4b, the devices 2a and 2b are part of the same group of devices.

At S150, an administrator 42 obtains a trust certificate and registers the trust certificate with device management platform 46.

In embodiments, on registering the trust certificate the administrator is provisioned with credential data with which the administrator may provision on one or more devices to enable the devices to access one or more services. Such credential data provided to the administrator may include a bootstrap credential such as a bootstrap server identifier (e.g. a URI, IPv6 address etc).

At S152 the administrator generates common credential data comprising a common certificate 62 for a first group of devices, whereby the common certificate 62 may be derived from the trust certificate (e.g. signed using a cryptographic key associated with the trust certificate (e.g. a private key)), and whereby the common credential data includes a trust indicator indicating that the certificate is a common certificate and further includes the bootstrap credential to enable the device 2 to authenticate with the bootstrap server 30.

At S154a, the administrator 42 provisions common credential data comprising the common certificate 62 on the first device 2a, and at S154b, the administrator 42 provisions common credential data comprising the common certificate 62 on the second device.

At S156a, device 2a uses the common credential data to authenticate itself with the bootstrap server 30 as part of a bootstrap process, whereby, for example, the bootstrap server 30 determines whether the common certificate has a chain of trust to a trusted source (e.g. by verifying a signature in the common certificate using a corresponding cryptographic key), the common credential data includes a trust indicator, and/or the device 2a is in the group to which the common credential data corresponds.

The bootstrap server 30 generates and/or obtains resource credential data to enable the authenticated device 2a to communicate with the resource server 4 and at S158a provisions the resource credential data 64a on the device 2a.

At S156b, device 2b uses the common credential data to authenticate itself with the bootstrap server 30 as part of a bootstrap process.

The bootstrap server 30 generates and/or obtains further credential data 64b to enable the authenticated device 2b to communicate with the resource server 4 and at S158b provisions the resource credential data 64b on the device 2b.

As above, whereas the common credential data is common for all devices of a group, the resource credential data 64a, 64b is unique for each device 2a, 2b and comprises a resource certificate and/or may include an identifier for the resource server (e.g. a URI, IPv6 address etc.). Additionally, or alternatively, the respective resource credential data 64a, 64b may comprise a bootstrap certificate, an identifier (e.g. a URI, IPv6 address etc.) for a bootstrap server with which the device 2a, 2b can authenticate.

At S160a, device 2a uses the resource credential data 64a to authenticate with the resource server 4, whereby, on being successfully authenticated, the device 2 may access one or more services 6.

At S160b, device 2b uses the resource credential data 64b to authenticate with the resource server 4, whereby, on being successfully authenticated, the device 2 may access one or more services 6.

As will be appreciated devices 2a, 2b may use respective bootstrap credentials to authenticate with bootstrap server 30 (or a different bootstrap server) to obtain further resource credential data if required.

Figure 5:
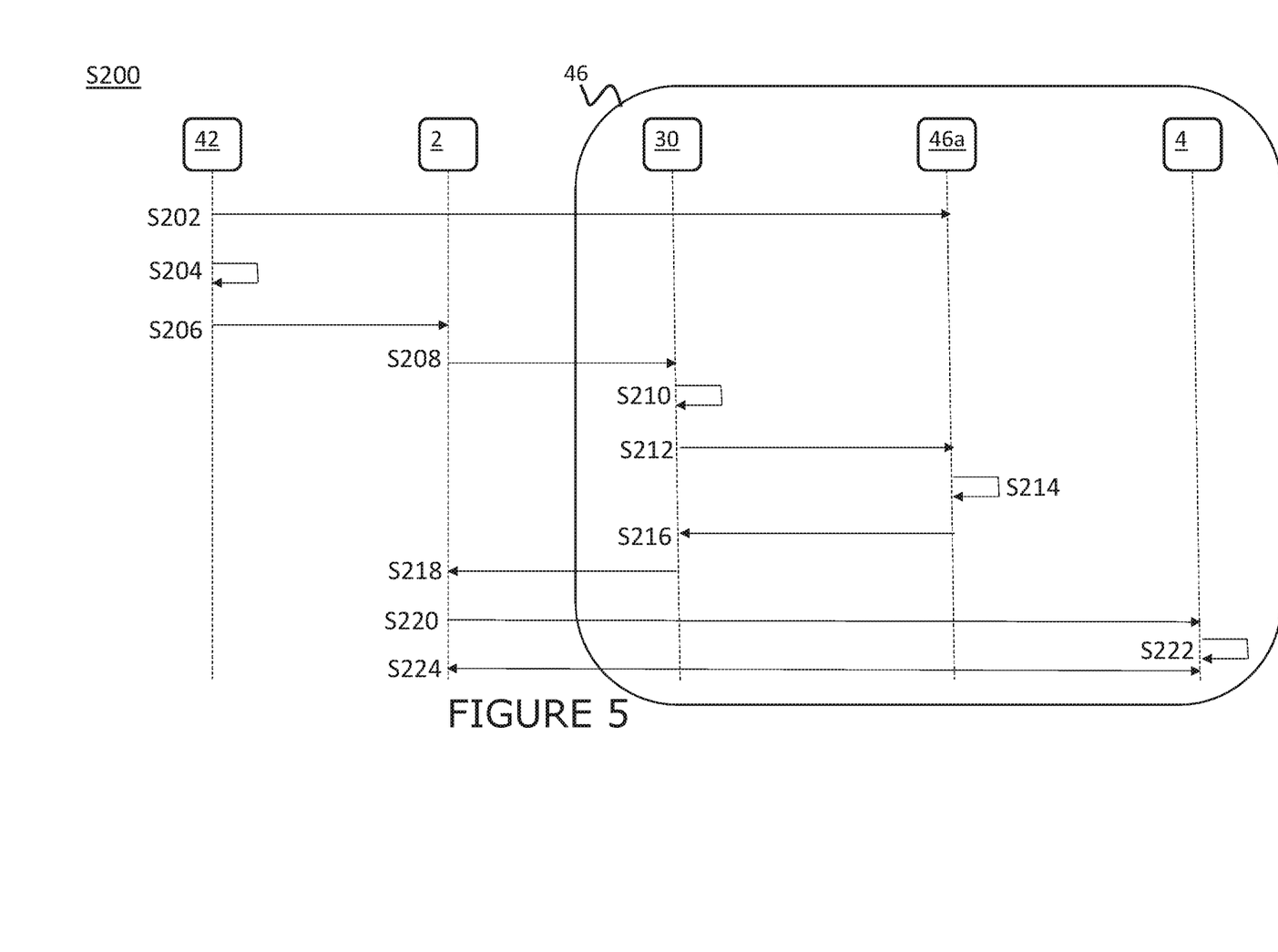
FIG. 5 schematically shows an example process in which a device is provisioned with common credential data to access one or more services.

FIG. 5 is a schematic diagram of an example process 200 in which a device 2 is provisioned with common credential data which enables the device 2 to access one or more services.

The device management platform 46 of FIG. 5 is depicted as comprising bootstrap server 30, resource server 4 (e.g. an LwM2M server) and platform interface 46a with which the bootstrap server and resource server 4 may interact to obtain data or information. It will be appreciated that the features of the device management platform 46 of FIG. 5 are illustrative examples, and the device management platform 46 may include additional or alternative devices/servers/resources/interfaces etc.

At S202, administrator 42 obtains a trust certificate (e.g. an X.509 certificate) and registers the trust certificate with device management platform 46 (e.g. as part of a BYOC process) via the interface 46a (e.g. an API).

At S204 the administrator 42 generates common credential data for a group of devices comprising one or more devices. In illustrative examples the common credential data comprises a common certificate derived from the trust certificate such that there is a chain of trust between the trust certificate and the common certificate. The common credential data further comprises a trust indicator and bootstrap credential.

At S206 the administrator 42 provisions the common credential data onto a device 2 in the group of devices.

At S208 the device 2 initiates a bootstrapping process with the bootstrap server 30 (e.g. after power on for the first time) using the common credential data (e.g. as part of a bootstrap request). In embodiments the device 2 establishes secure communications with the bootstrap server 30 using the common credential data.

At S210 the bootstrap server 30 verifies the common credential data received from the device 2 (e.g. whereby, for example, the bootstrap server 30 determines whether the common certificate has a chain of trust to a trusted source (e.g. by verifying a signature in the common certificate using a corresponding cryptographic key); the common certificate includes a trust indicator; and/or whether the device is in the group to which the common certificate corresponds). When the common credential data is verified, the bootstrap server 30 provisions further credential data on the device 2 to enable the device 2 to authenticate with the resource server 4 and to access one or more services.

As an illustrative example, on verifying the common credential data received from the device 2, the bootstrap server 30 generates or obtains resource credential data to enable the device 2 to authenticate with the resource server 4.

For example, the bootstrap server 30 generates a device bootstrap certificate using a bootstrap intermediate CA provisioned at the bootstrap server and at S212, provides the device bootstrap certificate to device management platform 46 via interface 46a.

At S214 device management platform 46 verifies the device bootstrap certificate, and at S216 provides, to the bootstrap server 30 the resource credential data for the device 2. In embodiments the resource credential data may comprise a resource certificate (e.g. server certificate) and/or a resource identifier (e.g. server identifier). In some embodiments the resource credential data may also comprise bootstrap credential data unique for that device 2 to enable the device 2 to authenticate with the bootstrap server 30 or a further bootstrap server (not shown). In other embodiments the bootstrap server may generate the bootstrap credential data (e.g. using the bootstrap intermediate CA).

In some embodiments the resource credential data may be generated for the device based on an account ID data registered at the device management platform 46 by the administrator 42.

At S218 the bootstrap server provisions the resource credential data on the device 2 to enable the device to access the resource server 4 (or a bootstrap server).

At S220, the device 2 authenticates itself with the resource server 4 using the resource credential provisioned thereon during the bootstrap process, whereby the device 2 may establish secure communications with the resource server 4 as part of the access request.

At S222 the resource server 4 processes the access request and at S224 when the device is authenticated, the device 2 is provided with access to the one or more services.

As above, when the resource credential data is invalid (e.g. due to expiration, corruption) the present techniques enable the one or more devices to use the common credential data and/or bootstrap credential data to obtain valid resource credential data.

In the case of a factory reset of a device, when, for example, the common credential data is permanently stored on the device, the device can use the common credential data to authenticate with the bootstrap server to obtain resource credential data therefrom.

Additionally, or alternatively, rather than the common credential data, the device can use the bootstrap credential data to obtain the resource credential data from the same bootstrap server 30 or a different bootstrap server.

In some embodiments the resource credential data may have a limited validity (e.g. one-time use, 'N'-time use, or limited by time (e.g. valid for 6 months from issue)). As such, the device may use the common certificate to authenticate with the bootstrap server to obtain access to the one or more services.

When the common certificate is no longer valid or is approaching the end of its validity lifetime, the device may generate an alert for the owner to obtain valid credential data (e.g. from the administrator or another source).

In some embodiments the bootstrap server 30 may also provision bootstrap credential data (e.g. a certificate; a bootstrap identifier) on the device 2 to enable the device 2 to authenticate with the bootstrap server 30 without the common certificate. As such, in some embodiments, the device 2 may authenticate with the bootstrap server 30 using the common certificate in an initial bootstrap operation and authenticate with the bootstrap server using the bootstrap credential data thereafter.

As described above, a group of devices may comprise one or more devices. The claims are not limited as to how the devices are grouped and devices may be grouped by function, by type, by manufacturer, by class, by power rating, by order of manufacture (e.g. date/time), by owner etc. In other embodiments the devices may be grouped in a random or pseudorandom manner.

In a further related aspect, the present techniques provide a non-transitory data carrier carrying code which, when implemented on a processor, causes the processor to carry out the method described herein.

The techniques further provides processor control code to implement the above-described systems and methods, for example on a general purpose computer system or on a digital signal processor (DSP). The techniques also provides a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A computer implemented method of bootstrapping a device, the method of bootstrapping performed by a LWM2M bootstrap server, where the LWM2M bootstrap server is to provision bootstrap credential data on the device to enable the device to authenticate with a resource server using the bootstrap credential data, the method comprising:
   receiving, at the LWM2M bootstrap server from the device as part of a bootstrap process, common credential data, the common credential data comprising a shared certificate and a trust indicator to indicate that the shared certificate is shared by all devices in a group of two or more devices, wherein the shared certificate includes a plurality of device identifiers defined by at least a respective device identifier for each device in the group of two or more devices;
   establishing, at the LWM2M bootstrap server, a secure communication channel with the device using the common credential data;
   authenticating, at the LWM2M bootstrap server, the device using the shared certificate and when the device is authenticated:
   obtaining, at the LWM2M bootstrap server, resource credential data unique for the device, the resource credential data to enable the device to authenticate with the resource server after the method of bootstrapping is complete;
   transmitting, from the LWM2M bootstrap server to the device, the resource credential data.

2. The method of claim 1 comprising:
   obtaining, at the LWM2M bootstrap server, bootstrap credential data based on or in response to the common credential data, the bootstrap credential data to enable the device to authenticate with the LWM2M bootstrap server or a further LWM2M bootstrap server;
   transmitting, from the LWM2M bootstrap server to the device, the bootstrap credential data.

3. The method of claim 1, wherein the common credential data comprises one or more of:
   a common certificate, cryptographic keys, and a bootstrap identifier.

4. The method of claim 3, wherein the bootstrap identifier comprises one or more of:
   a Uniform Resource Locator (URL), a Uniform Resource Indicator (URI), a fully qualified domain name (FQDN), a Uniform Resource Name (URN) and an IP address.

5. The method of claim 3, further comprising:
   verifying, at the LWM2M bootstrap server, that the common certificate has a chain of trust to a trusted source.

6. The method of claim 5, wherein the trusted source comprises a certificate authority.

7. The method of claim 5, further comprising:
   obtaining the resource credential data when it is verified that: the device is in the group to which the common credential data corresponds and/or that the common certificate has a chain of trust to a trusted source.

8. The method of claim 1, wherein obtaining resource credential data comprises:
   generating, at the LWM2M bootstrap server, the resource credential data.

9. The method of claim 1, wherein obtaining the resource credential data comprises:
   communicating with a further resource to request the resource credential data for the device;
   receiving, at the LWM2M bootstrap server, the resource credential data.

10. The method of claim 1, further comprising:
    verifying, at the LWM2M bootstrap server, that the device is in the group to which the common credential data corresponds.

11. A computer implemented method of bootstrapping a device from a LWM2M bootstrap server, wherein the LWM2M bootstrap server is to provision bootstrap credential data on the device to enable the device to authenticate with a resource server using the bootstrap credential data the method comprising:
    transmitting, from the device to a LWM2M bootstrap server as part of a bootstrap process, common credential data, the common credential data comprising a shared certificate and trust indicator to indicate that the shared certificate is shared by all devices in a group of two or more devices, wherein the shared certificate is to allow the bootstrap server authenticate the device, and wherein the shared certificate includes a plurality of device identifiers defined by at least a respective device identifier for each device in the group of two or more devices;
    establishing, at the device, a secure communication channel with the LWM2M bootstrap server using the common credential data; and
    receiving, from the LWM2M bootstrap server, first resource credential data unique for the device to enable the device to authenticate with the resource server after the method of bootstrapping is complete.

12. The method of claim 11, comprising:
    authenticating with the second server using the first resource credential data.

13. The method of claim 11, further comprising:
    receiving, from the LWM2M bootstrap server, bootstrap credential data to enable the device to authenticate with the LWM2M bootstrap server or a third server.

14. The method of claim 13, wherein the bootstrap credential data is unique for the device.

15. The method of claim 13, comprising:
    using the bootstrap credential data to authenticate with the LWM2M bootstrap server when the validity of the first resource credential data expires.

16. The method of claim 11, wherein the common credential data is permanently stored at the device.

17. The method of claim 11, wherein one or both of the common credential data and the first credential data has a limited validity.

18. A device comprising:
   storage circuitry to store common credential data the common credential data comprising a shared certificate and a trust indicator to indicate that the shared certificate is shared by all devices in a group of two or more devices, wherein the shared certificate is to allow a LWM2M bootstrap service authenticate the device, and wherein the shared certificate includes a plurality of device identifiers defined by at least a respective device identifier for each device in the group of two or more devices;
   communication circuitry to transmit, from the device to the LWM2M bootstrap server as part of a bootstrap process, the common credential data, establish a secure communication channel with the LWM2M bootstrap server using the common credential data, and to receive, from the LWM2M bootstrap server, first resource credential data unique for the device; and
   wherein the device is to authenticate with a resource server using the first resource credential data after the method of bootstrapping is complete.

* * * * *